UNITED STATES PATENT OFFICE.

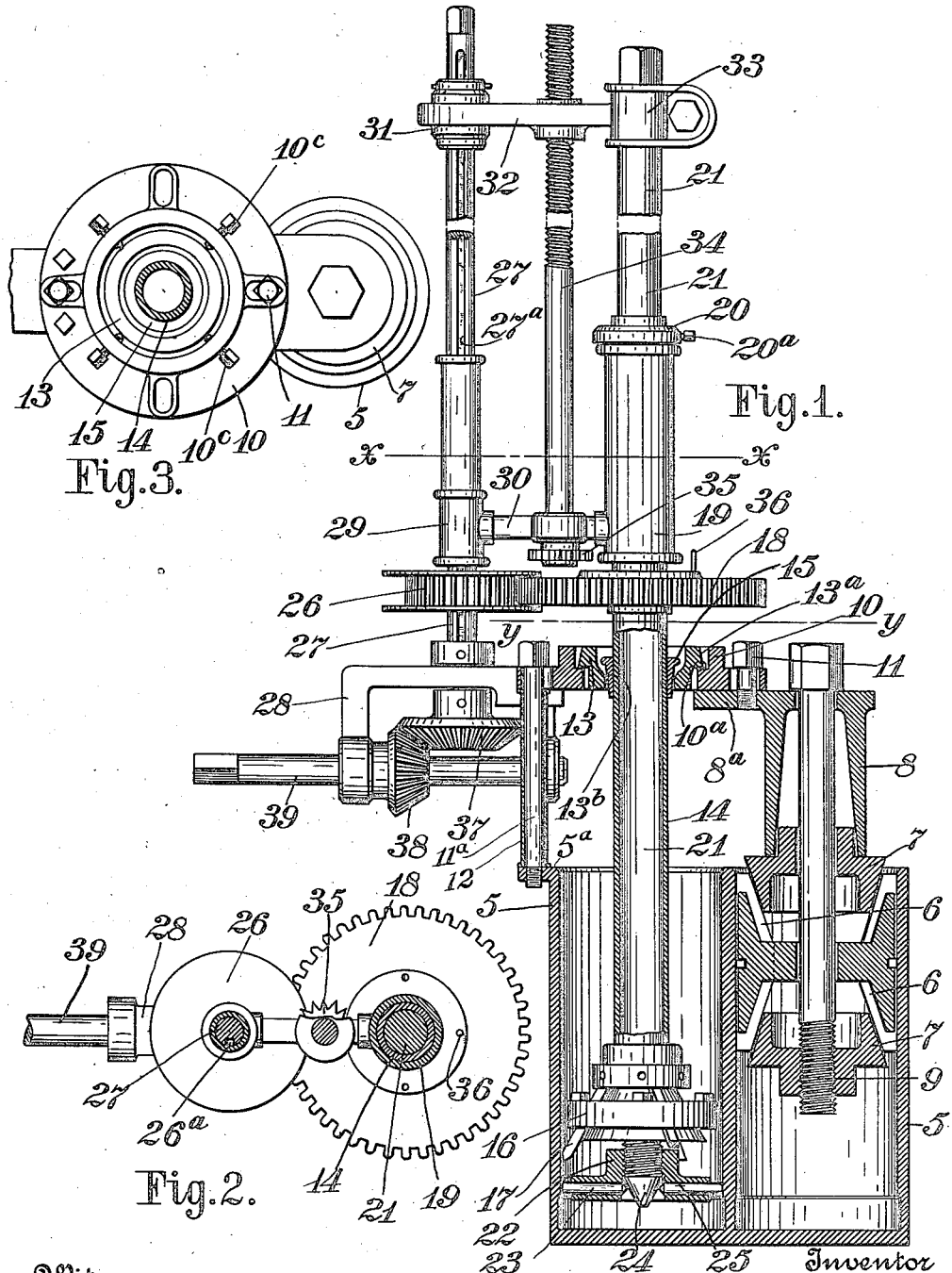

WILLIAM H. COWELL, OF COLUMBUS, OHIO.

BORING MECHANISM.

1,220,399.　　　　Specification of Letters Patent.　　Patented Mar. 27, 1917.

Application filed November 22, 1915. Serial No. 62,717.

*To all whom it may concern:*

Be it known that I, WILLIAM H. COWELL, a citizen of the United States, residing at Columbus, in the county of Franklin and State of Ohio, have invented a certain new and useful Improvement in Boring Mechanisms, of which the following is a specification.

One of the principal objects of this invention is to provide means of simplified and economical construction especially adapted for reboring tubular objects, such as engine cylinders. A further object is to so construct such means that it can be quickly and accurately applied to the cylinder for the purpose of boring.

The invention is embodied in the construction shown and described and then particularly claimed.

In the accompanying drawings—

Figure 1 is a view illustrating the invention partly in elevation and partly in section.

Fig. 2 is a plan and sectional view of the line $x$—$x$ Fig. 1 looking down.

Fig. 3 is a similar view on the line $y$—$y$ Fig. 1.

In Fig. 1 the characters 5, 5 designate a pair of engine cylinders. In one of the cylinders—the right hand one—is secured an expansion mandrel of ordinary construction, said mandrel including central expanding female members 6, opposing and coöperating male members 7, 7, a post 8 and a screw 9 to draw the male members toward each other to spread the female members and thereby secure the post 8 in desired fixed position. The post has a table $8^a$ to receive one side of a ring 10 constituting one member of a centering device for the tubular shaft 14 of the boring tool which is to bore the adjacent cylinder as hereinafter explained. The said ring is secured to the table by means of a bolt 11 passed through a slot in the ring. The other side of the ring 10 is supported by a sleeve 12 secured by means of a bolt $11^a$ to the flange of the cylinder to be bored, said bolt $11^a$ passing through the sleeve and through a slot in the ring and the said sleeve. The ring 10 is made with an internal shoulder $10^a$ upon which is supported another ring 13 having an outer tapering rim $13^a$ and an inner rounding bearing surface $13^b$. Said ring 13 is of such diameter as to have considerable horizontal play thereon in all directions on the shoulder $10^a$, but the ring 10 is provided with several set screws $10^c$ adjustable against the tapering rim $13^a$ to fix the ring 13 in any position to which it may be moved on the shoulder $10^a$.

The tubular shaft of the boring tool, which shaft is designated 14, has upon it a downwardly tapering thimble 15 engaged by the bearing surface $13^b$ of the inner ring 13. The lower end of this tubular shaft contains a suitable head 16 for carrying suitable boring tools 17 which need not be further described as these do not constitute the subject of the present application for patent. Upon the upper portion of the tubular shaft 14 above the centering device is secured a gear wheel 18 through which the said shaft is rotated. Loose upon said tubular tool shaft above the gear 18 is a sleeve 19 fixed on the shaft to move vertically therewith by means of a collar 20, having set screw $20^a$ to secure the collar to the tubular shaft. Within the tubular shaft is a bar 21 having at its lower end a centering device comprising a head 22 and movable radial pins 23 of equal length. The lower end of the bar 21 is made conical, as seen at 24, and is threaded, as at 25, to receive said head so that by turning said head on the bar or reversely turning the bar in the head the projection of the pins 23 can be made greater or less to impinge against the wall of the cylinder to be bored. This device serves to center the tubular tool bearing shaft at its lower end while the ring 13 is manipulated to properly aline the upper portion of said shaft.

The tool shaft is driven by means of a gear wheel 26 on a shaft 27 parallel to the tubular tool shaft, said shaft being supported in a suitable bracket 28 bolted to the outer ring 10. The shaft 27 is provided with a longitudinal groove $27^a$ engaged by a spline $26^a$. The gear wheel 26 is flanged to travel with the gear wheel 18. On the lower portion of the shaft 27 opposite the collar 19 is a loose collar 29 and connecting these two collars is a bridge 30, and on the upper portion of said shaft 27 is a collar 31 connected by a bridge 32 with a collar 33 clamped to the upper end of the bar 21.

Threadedly engaging the bridge 32 is a feed screw 34 having its lower end swiveled to the bridge 30 and provided with a star wheel 35 having its teeth arranged to be struck by one or more pins 36 on the upper side of the gear wheel 18 when the same is driven. The feed screw 34 thus raises or lowers the tubular tool carrying shaft according to the direction in which the said gear is turned. The shaft 27 is shown to be provided at its lower end with a bevel gear 37 engaged by another bevel gear 38 on a power shaft 39 supported in a bracket 28 which shaft can be turned by hand or other power as may be desired.

In practice the centering device at the lower end of the bar 21 is first placed in position within the cylinder to be bored but when this is being done the boring tool is not yet within the cylinder. The boring device is then seated and properly adjusted with its several cutting tools resting on the usual beveled edge 5ᵃ of the cylinder after which the set screws 10ᶜ are turned up to fix the inner ring 13 with reference to the outer ring 10. It will be particularly noted in this connection that the rounded inner rim 13ᵇ permits of the rocking of the ring on the thimble to obtain an accurate centering and alining of the tool shaft for subsequent boring.

The cylinder is bored from the open end downward, and when the cutter head nearly or quite reaches the centering device the clamp 33 is released and the centering pins 23 released by applying a wrench to the squared upper end of the guide bar or shaft 21. This permits the guide bar 21 to drop below the wearing surface of the cylinder and makes room for the cutter head to complete the boring for the full length of piston travel.

What I claim is:

1. A boring mechanism including in combination, a tubular tool carrying shaft, a bar in said tubular tool carrying shaft, a centering device on said bar for centering one end of the tool carrying shaft, said centering device constructed to engage the inner surface of the wall of the object to be bored, and a supplementary centering device for the other end of the tool shaft.

2. In a boring mechanism, a centering device for a tool carrying shaft including, in combination a fixed ring, a second ring engaging the tool shaft adjustable on the first mentioned ring, said last named ring having a rounded inner bearing surface, and means for fixing said second ring with reference to the first mentioned ring.

3. In a boring mechanism, a centering device for a tool carrying shaft including, in combination a fixed ring, a second ring, said last named ring having a rounded inner bearing surface, a thimble on the shaft engaged by said rounded surface and means for fixing said second ring with reference to the first mentioned ring.

4. In boring mechanism, in combination, a tubular tool carrying shaft, a guide bar for said tubular shaft having centering device thereon, supplemental means for centering said guide bar and shaft, and means for turning said tool carrying shaft on said guide bar and feeding the same.

5. In boring mechanism, in combination, a tubular tool carrying shaft, a guide bar for said tubular shaft having a centering device thereon and means for fixing the same in position, supplemental means for centering said guide bar and shaft and means for turning said tool carrying shaft on said guide bar and feeding the same.

WILLIAM H. COWELL.